Patented June 24, 1930

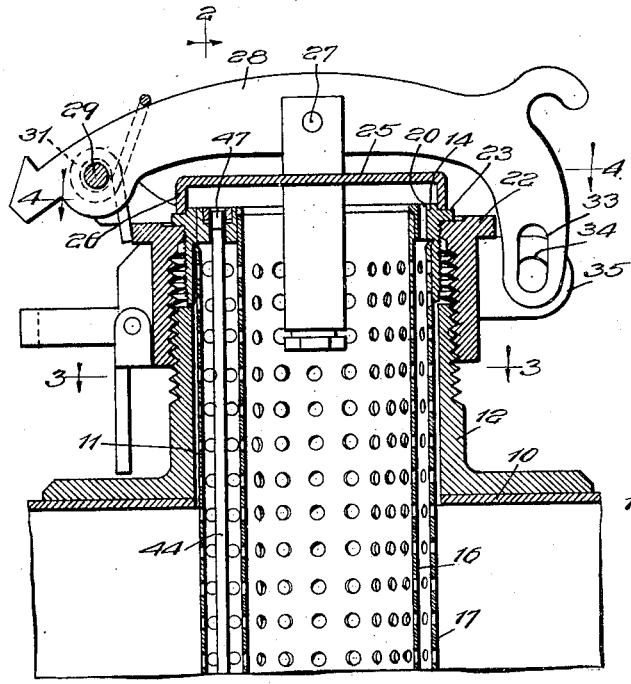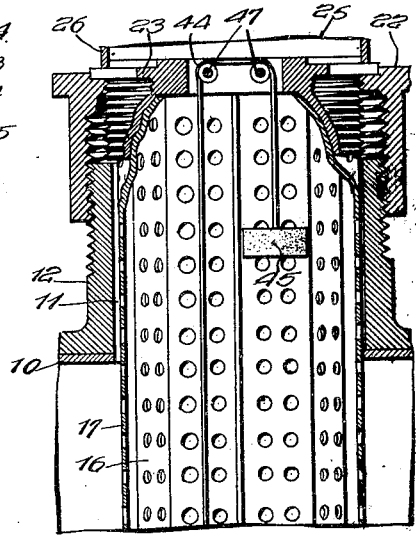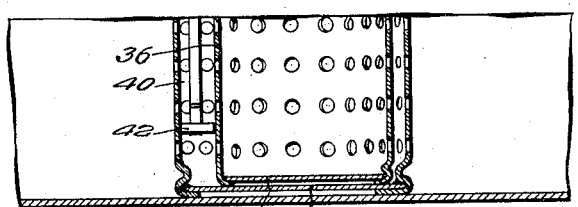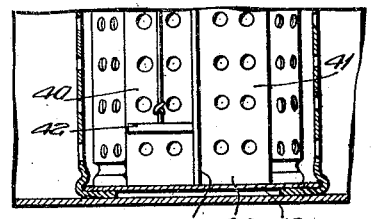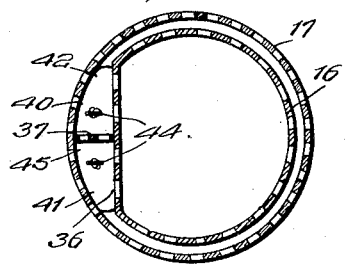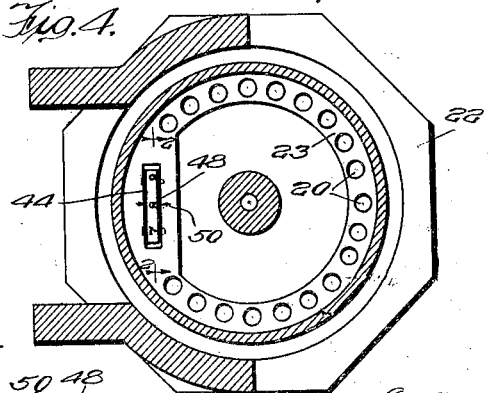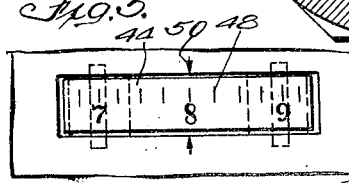

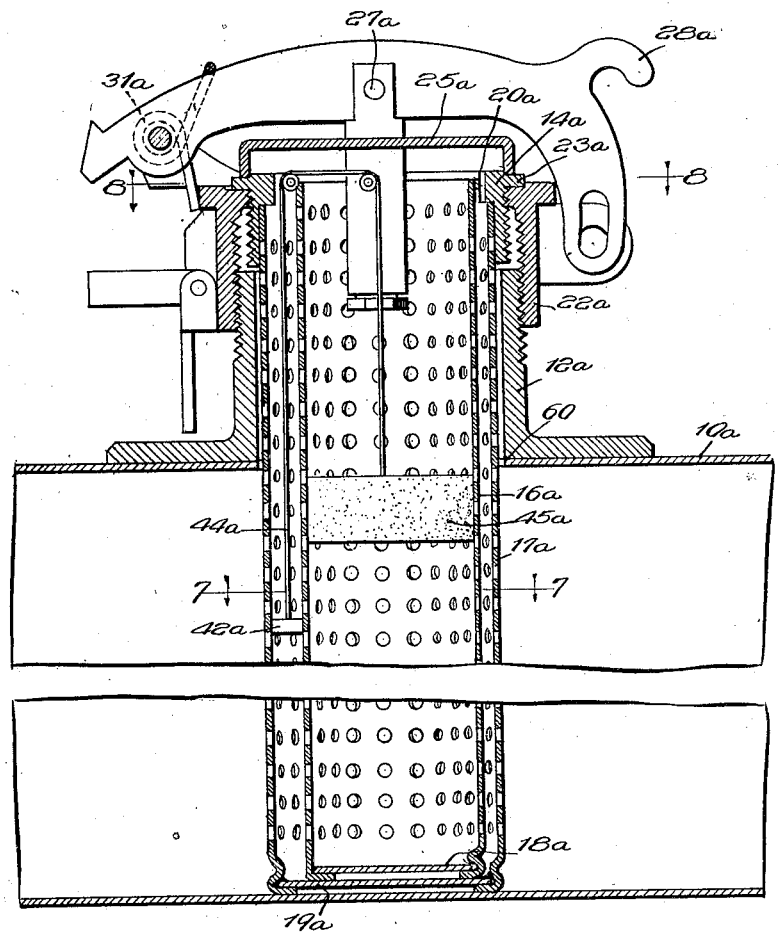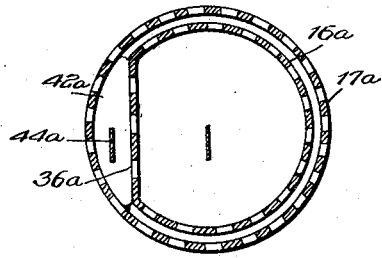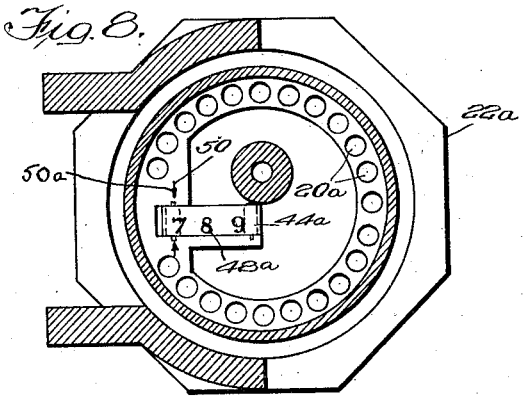

1,767,641

UNITED STATES PATENT OFFICE

RUDOLPH J. ANSCHICKS, OF CHICAGO, ILLINOIS, ASSIGNOR TO PROTECTOSEAL COMPANY OF AMERICA, OF CHICAGO, ILLINOIS, A CORPORATION OF ILLINOIS

GAUGE

Application filed July 13, 1925. Serial No. 43,296.

My invention relates to gauges and particularly to gauges for indicating the quantity of liquid stored within receptacles, such as gasoline storage tanks and the like.

The invention has among its other objects the production of devices of the kind described which are simple, convenient, durable, efficient and satisfactory for use wherever found applicable. Many other objects and advantages of the construction herein shown and described will be obvious to those skilled in the art from the disclosure herein given.

One form of the invention is embodied in a device for indicating the quantity of liquid contained in a tank adapted to hold explosive liquids. The tank has a filler opening whereinto two perforate tubes are arranged one within the other to prevent ignition of the contents of the tank. A tape trained or hung over rollers mounted at the upper ends of the tubes has a weight and a float secured to its ends, the weight and float being disposed between the tubes. The weight keeps the tape under tension and the tape passes back and forth over the rollers as the float rises and falls with the changing liquid levels in the tank. Suitable markings on the tape indicate the quantity of liquid stored in the tank for any given position of the float.

In another form of the invention, the improved liquid level indicating means is mounted in the venting opening of a tank. The tank is provided with perforate tubes arranged one within the other at the venting opening to protect the contents of the tank. A tape suspended from rollers has a weight and a float secured to its ends, the float being disposed within the inner tube and the weight being disposed between the tubes. The tape is provided with suitable markings for indicating the quantity of liquid stored in the tank.

To this end my invention consists in the novel construction, arrangement and combination of parts herein shown and described, and more particularly pointed out in the claim.

In the drawings, wherein like reference characters indicate like or corresponding parts:

Fig. 1 is a vertical section taken through the filler opening of a tank, apparatus embodying the invention being disposed in said filler opening;

Fig. 2 is a section taken on line 2—2 of Fig. 1;

Fig. 3 is a section taken on line 3—3 of Fig. 1;

Fig. 4 is a section taken on line 4—4 of Fig. 1;

Fig. 5 is an enlarged fragmentary section taken on the same line as Fig. 4;

Fig. 6 is a vertical section taken through the vent opening of a tank, apparatus embodying another form of my invention being disposed in the vent opening; and Figs. 7 and 8 are sections taken on lines 7—7 and 8—8, respectively, of Fig. 6.

Referring for the present to Figs. 1 to 5, inclusive, 10 is a tank or receptacle of suitable size, shape and material provided with a filler and vent opening 11 at which is arranged a tubular flange 12. The tank 10 may be employed to store gasoline or any other explosive liquid but the invention is limited to such use only in so far as defined in the appended claim. Mounted above the tubular flange 12 and detachably secured by means hereinafter described is a sleeve 14 which carries perforate tubes 16 and 17, the tube 16 being disposed coaxially within the tube 17. The tubes 16 and 17 may be made of any suitable size, shape and material, but I prefer to form them from perforated sheet metal and have so shown them. The lower ends of the tubes 16 and 17 are preferably closed by imperforate bottom plates 18 and 19, respectively. The two tubes are secured to the sleeve 14 in any suitable manner. As shown in Figs. 1 and 4, the sleeve 14 is provided with a plurality of venting openings 20 which communicate with the annular space between the tubes 16 and 17. The sleeve 14 is screw-threaded into a collar 22, which is, in turn, screw-threaded upon the tubular flange 12, the sleeve 14 being provided with an annular flange 23 adapted to limit the distance the sleeve may be inserted in the collar.

The central opening through the sleeve 14 and the venting openings 20 are normally closed by a cap member or cover 25 which is preferably provided with a flange, as indicated at 26. The cover 25 is pivotally connected by a pin 27 to an arm 28, the arm 28 being pivotally secured to the collar 22 by a pin 29. Means for holding the cover 25 in the position wherein it closes the venting openings 20 and the central opening through the sleeve 14 comprises a spring 31 disposed around the pin 29. I have not considered it necessary to illustrate the construction of the cover in detail, but the cover is preferably provided with a valved opening therethrough whereby air may enter the tank 10 when the pressure within the tank exceeds atmospheric pressure, the spring 31 may yield to permit the cover 25 to be unseated so that the pressure within the tank will be relieved. The arm 28 is preferably provided with a slot 33. When the cover 25 is in its closed position, the slot 33 registers with apertures 34 formed in lugs 35 which project from the collar 22. This construction permits a padlock (not shown) to be employed to lock the cover in its closed position.

As best shown in Figs. 1, 2 and 3, a portion of the perforate tube 16 is flattened as at 36, and a perforate partition 37 is mounted between the tube 17 and the flattened portion 36. This provides two shafts 40 and 41 extending longitudinally of the tube 16 and 17. A weight 42 disposed in the shaft 40 is secured to one end of a tape 44 which has its other end secured to a float 45 disposed in the shaft 41, the tape 44 being trained over rollers 47 rotatably journaled in the sleeve 14. The arrangement is such that the float 45 rises and falls with the changing liquid levels in the tank. The weight 42 is so designed that it will hold the tape 44 taut or in an extended position at all times. Obviously, the tape 44, the weight 42 and the float 45 will adjust themselves each time liquid is drawn from or poured into the tank 10, and the position assumed by the tape will indicate the amount of liquid in the tank. In order that the operator or attendant may readily ascertain the amount of liquid held in the tank 10, I provide indicia 48 which preferably read in gallons, the sleeve 14 being provided with markings 50 which indicate at what point the readings should be taken.

In practice, the tank 10 is preferably filled through the filler opening 11, the cover 25 being first swung into its open position against the action of the spring 31. The perforate tubes 16 and 17 prevent the contents of the tank from becoming ignited and exploding as it is impossible for a flame to pass through the apertures formed in the tubes. It will be noted that the tape 44, the weight 42 and the float 45 do not interfere with the filling operation.

In the above described embodiment of the invention it is necessary to swing the cover 25 into its open position each time a reading is taken from the tape 44. This is advantageous in some instances, but it is readily understood that a window may be provided in the cover 25 through which the indicia 48 would be visible.

Referring now to Figs. 6 to 8, inclusive, $10^a$ is a tank which is substantially identical with the aforementioned tank 10 and may be used for the same purpose. The tank $10^a$ is provided with a vent opening 60 around which is arranged a tubular flange $12^a$. Mounted above the tubular flange $12^a$ and detachably secured thereto by means hereinafter described is a sleeve $14^a$ in which are positioned the upper ends of two perforate tubes $16^a$ and $17^a$. The perforate tube $17^a$ is provided with an imperforate bottom plate $19^a$ upon which rests the lower end of the perforate tube $16^a$. The perforate tube $16^a$ may be provided with an imperforate bottom $18^a$. The sleeve $14^a$ is provided with a plurality of venting apertures $20^a$ which communicate with a substantially annular space formed between the perforate tubes $16^a$ and $17^a$. The sleeve $14^a$ is preferably screw-threaded into a collar $22^a$ which is, in turn, screw-threaded in the tubular member $12^a$. The distance which the sleeve $14^a$ may be inserted in the collar $22^a$ is limited by a flange $23^a$ formed upon the sleeve. The venting apertures $20^a$ and and the central opening through the sleeve $14^a$ are normally closed by a cap member or cover $25^a$ which is pivotally secured by a pin $27^a$ to an arm $28^a$ pivotally mounted upon the collar $22^a$. The cover $25^a$ is not illustrated in detail, but is preferably provided with a valved opening whereby air may flow into the tank $10^a$ when the pressure within the tank falls below atmospheric pressure. A spring $31^a$ is adapted to yieldingly hold the cover $25^a$ in a position wherein it closes the venting apertures $20^a$ and the central opening through the sleeve $14^a$. When the pressure within the tank $10^a$ rises above atmospheric pressure, the cover $25^a$ may open against the action of the spring $31^a$ until the pressure within the tank is relieved.

One portion of the tube $16^a$ is flattened as at $36^a$ so that a weight $42^a$ may be disposed between the tubes $16^a$ and $17^a$. The weight $42^a$ is secured to one end of a tape $44^a$ which has its other end secured to a float $45^a$ disposed in the tube $16^a$. The construction is such that the weight $42^a$ will hold the tape $44^a$ in an extended condition at all times, the float $45^a$, of course, rising and falling, respectively, when liquid is poured into or withdrawn from the tank $10^a$. The tape $44^a$ is preferably provided with indicia $48^a$ which preferably indicate in gallons the amount of liquid stored within the tank $10^a$, the sleeve $14^a$ being provided with markings 50ª to indicate the point at which the readings must be taken.

While I have described and shown the members 44 and 44ª as tapes, it is to be understood that I am not limited to this construction, as any equivalent means may be employed in place of the tape if it is so desired. However, in the preferred embodiments of the invention, I generally employ a braided metallic tape which does not deteriorate or corrode when immersed in gasoline, kerosene or the like.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

In a device of the kind described and in combination with a tank, a member arranged for securement to the tank, and a cover member operatively carried thereon, said first-mentioned member being of annular shape and provided with an opening at one side, and a tape carried by said first-mentioned member and displayable through said opening, means connected with the tape for controlling movement thereof upon variation of the liquid level within the tank, and a pair of foraminous telescoping cylinders having an annular space therebetween depending from said first mentioned member and forming a housing for said tape and the parts operatively connected thereto.

In testimony whereof, I have hereunto signed my name.

RUDOLPH J. ANSCHICKS.